May 22, 1934.  M. BEHAN ET AL  1,959,808
ANT TRAP
Filed May 24, 1933
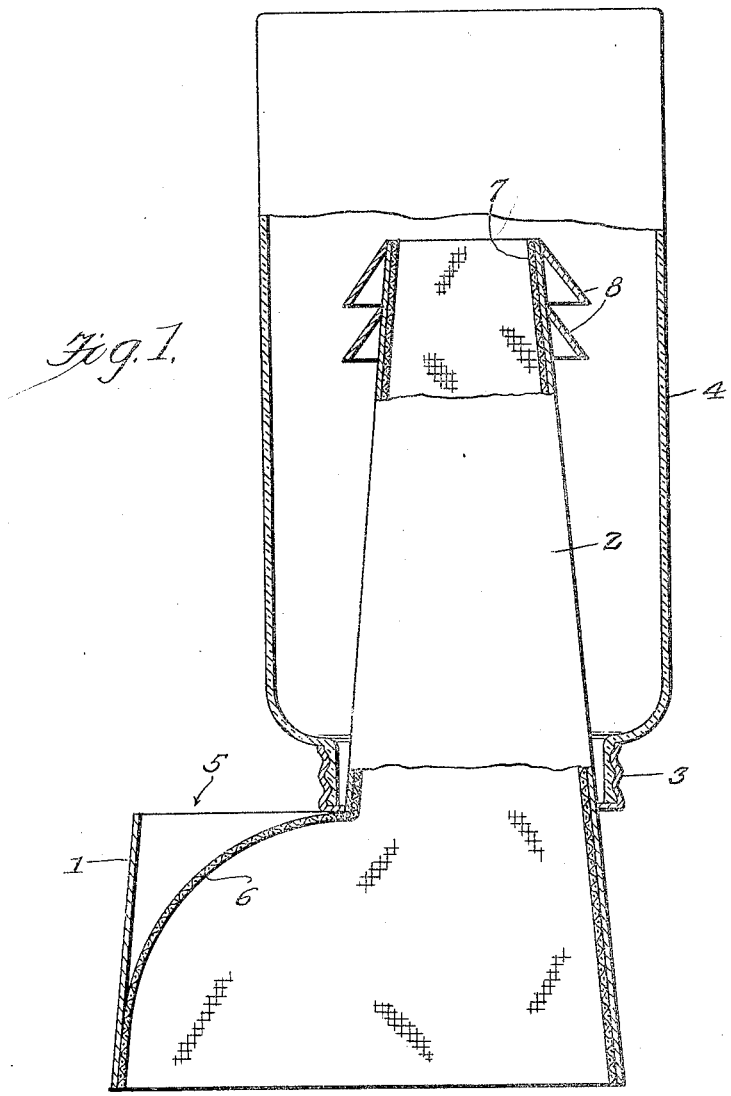
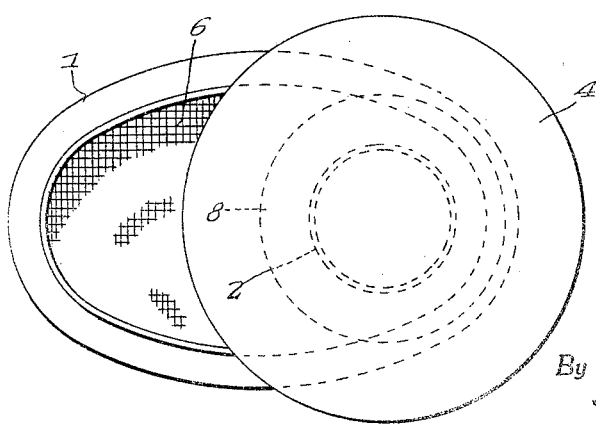
Inventor
Mack Behan,
William P. Lutfy,
By Clarence A. O'Brien
Attorney Patented May 22, 1934

1,959,808

UNITED STATES PATENT OFFICE 1,959,808

ANT TRAP

Mack. Behan and William P. Lutfy,
Phoenix, Ariz.

Application May 24, 1933, Serial No. 672,716

1 Claim. (Cl. 43—121)

The present invention relates to new and useful improvements in ant traps of the type including an inverted jar or container and has for one of its important objects to provide, in a manner as hereinafter set forth a trap of this character embodying novel ventilating means for preventing the formation of condensation in the jar or container.

Other objects of the invention are to provide an ant trap of the character described which will be simple in construction, strong, durable, efficient and reliable in use, compact and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:—

Figure 1 is a view principally in vertical section of an ant trap constructed in accordance with the present invention.

Figure 2 is a view in top plan thereof.

Referring now to the drawing in detail, it will be seen that the embodiment of the invention which has been illustrated comprises a tapered base 1 of suitable metal, said base being substantially oval in plan and being open at its top and bottom. Rising from one end portion of the base 1 is an integral tapered tube 2 which is also open at both ends. A threaded flange 3 is fixed on the lower portion of the tapered tube 2 for threadedly receiving an inverted jar or similar container 4. It will thus be seen that the tube 2 opens into the jar 4. The arrangement of the tube 2 on the base 1 is such that a ventilating opening 5 is provided which prevents condensation in the jar 4.

A substantially dome-shaped foraminous lining 6 is mounted in the base 1, said lining including an integral, tapered extension 7 which extends upwardly in the tube 2 to the upper end of said tube. Vertically spaced substantially conical guards 8 are mounted on the upper end portion of the tube 2.

In use, the base 1 is positioned over an ant hill so that the ants, when emerging, will climb up the foraminous lining 6 and enter the tube 2, said lining 6 and the extension 7 thereof facilitating the ascent of the ants, as will be understood. When the ants emerge at the top of the tube 2 and pass on to the uppermost guard 8 they are precipitated into the lower portion of the inverted jar 4, the upper surfaces of the guards being smooth to prevent the obtaining of traction thereon. Further, it will be seen that the guards 8 will prevent the ants from re-entering the tube 2 by climbing up said tube on the exterior thereof. When desired, the jar 4 may be conveniently removed from the threaded flange 3 for emptying or other purposes.

It is believed that the many advantages of an ant trap constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:—

A trap of the class described comprising an elongated base member having its top and bottom open, a tube having its lower end connected with the top of the base at one end thereof, whereby the other end of the base is open at its top, a threaded flange connected with the top of the base and surrounding the lower end of the tube and spaced therefrom, an inverted jar having its mouth threaded to the flange with the jar enclosing the tube, said tube having a downwardly and outwardly sloping flange at its top part and a foraminous lining in the tube and base, said lining having an upwardly and inwardly curved portion extending across the upper portion of the base below the open top portion thereof.

MACK. BEHAN.
WILLIAM P. LUTFY.